(12) United States Patent
Wang et al.

(10) Patent No.: US 9,257,821 B2
(45) Date of Patent: Feb. 9, 2016

(54) CABLE STRIPPER

(71) Applicant: Changzhou Amphenol Fuyang Communication Equip. Co., Ltd., Changzhou (CN)

(72) Inventors: Pengjin Wang, Changzhou (CN); Tingxing Sheng, Changzhou (CN)

(73) Assignee: Changzhou Amphenol Fuyang Communication Equipment Co., Ltd. (CN)

( * ) Notice: Subject to any disclaimer, the term of this patent is extended or adjusted under 35 U.S.C. 154(b) by 140 days.

(21) Appl. No.: 13/898,885

(22) Filed: May 21, 2013

(65) Prior Publication Data

US 2014/0076108 A1    Mar. 20, 2014

(30) Foreign Application Priority Data

Sep. 17, 2012 (CN) .......................... 2012 1 1472100

(51) Int. Cl.
*H02G 1/12* (2006.01)
(52) U.S. Cl.
CPC ........... *H02G 1/1221* (2013.01); *H02G 1/1217* (2013.01)

(58) Field of Classification Search
CPC . H02G 1/1221; H02G 1/1224; H02G 1/1226; H02G 1/1217
See application file for complete search history.

(56) References Cited

U.S. PATENT DOCUMENTS

| | | | | |
|---|---|---|---|---|
| 6,397,474 B1 * | 6/2002 | Losinger | ......................... | 30/90.2 |
| 6,510,610 B2 * | 1/2003 | Losinger | ......................... | 30/90.2 |
| 6,640,439 B2 * | 11/2003 | Losinger | ......................... | 30/90.2 |
| 6,755,109 B2 * | 6/2004 | Russell | ........................... | 83/591 |
| 7,984,553 B1 * | 7/2011 | Miller et al. | ................... | 30/90.1 |
| 2012/0192414 A1 * | 8/2012 | Montena et al. | ................ | 29/828 |

* cited by examiner

*Primary Examiner* — David B Thomas
(74) *Attorney, Agent, or Firm* — Blank Rome LLP

(57) ABSTRACT

A cable stripper having a stripper body having at least one hole and opposite first and second ends, a cable stripper guide having a connection part and a guiding part, the connection part engaging the first end of the cable stripper body, at least one marble located within the at least one hole in the cable stripper body, and at least one spring having first and second ends and being located within the at least one hole in the cable stripper body and engaging the at least one marble.

14 Claims, 3 Drawing Sheets

CABLE STRIPPER

RELATED APPLICATIONS

The present application claims priority under 35 U.S.C. §119 to Chinese Patent Application No. 201211472100.0, filed Sep. 17, 2012, the entire disclosure of which is incorporated herein by reference.

FIELD OF THE INVENTION

The present application relates to a cable stripper, and preferably to a cable stripper used to strip coaxial corrugated cable. Specifically, the cable stripper includes a cable stripper guide which aids the cable stripper in stripping an outer conductor of the corrugated cable to half of peak.

BACKGROUND OF THE INVENTION

At present, high market demand for communication equipment products requires mass production of associated cable. Generally, communication cable consists of a cable jacket layer, an outer conductor layer, an insulating layer, and an inner conductor layer. The outer conductor layer may have a waved ring shape, thereby forming a peak and trough pattern known as "corrugation."

Conventional cable strippers often fail to properly strip the outer conductor layer of the cable to ensure proper crimping to a cable clamp, for example.

Accordingly, there is a need for a cable stripper that strips an outer conductor of a cable to half of the peak of the corrugation, thereby improving the quality of the stripped cable.

SUMMARY OF THE INVENTION

The present invention provides a cable stripper, comprising a cable stripper body having at least one hole and opposite first and second ends, a cable stripper guide having a connection part and a guiding part, the connection part engaging the first end of the cable stripper body, at least one marble located within the at least one hole in the cable stripper body, and at least one spring having first and second ends and being located within the at least one hole in the cable stripper body and engaging the at least one marble.

The present invention further provides a cable stripper comprising a cable stripper body having opposite first and second ends, an inner bore, and a plurality of holes extending to the inner bore, a cable stripper guide having a connection part and a guiding part, the connection part engaging the first end of the cable stripper body, a hexangular end cap connection handle engaging the second end of the cable stripper body, a plurality of marbles, each marble located within one of the plurality of holes on the cable stripper body, a plurality of springs, each spring having first and second ends, and being located within one of the plurality of holes in the cable stripper body and engaging one of the plurality of marbles, a cable jacket stripper located within the cable stripper body between the guiding part of the cable stripper guide and the plurality of marbles, an outer conductor stripper located within the cable stripper body between the plurality of marbles and the hexangular end cap connection handle, an inner conductor cutter located on the cable stripper body between the outer conductor stripper and the hexangular end cap connection handle, and an insulating layer inner conductor chamfer turning cutter located on the cable stripper body between the plurality of marbles and the hexangular end cap connection handle, wherein the first end of each of the plurality of springs engages each of the plurality of marbles, and the second end of each of the plurality of springs is coupled to the cable stripper body with a fastener.

The invention also provides a method of stripping a coaxial corrugated cable stripper, comprising the steps of providing a cable having an outer conductor layer, the outer conductor layer including corrugation having a plurality of peaks and a pitch, providing a cable stripper, the cable stripper including a cable stripper body having a plurality of holes and first and second ends, a cable stripper guide having a connection part and a guiding part, the connection part engaging the first end of the cable stripper body, a plurality of marbles, each marble located within each of the plurality of holes in the cable stripper body, a plurality of springs, each spring having first and second ends, and each being located within each of the plurality of holes in the cable stripper body and engaging each of the plurality of marbles, a cable jacket stripper located on the cable stripper body, and an outer conductor stripper located on the cable stripper body, then inserting the cable into the guiding part of the cable stripping guide of the cable stripper and rotating the cable stripper such that a distance between the outer conductor stripper and each of the plurality of marbles equals $nL + \frac{1}{2}L$, wherein n equals the number of the plurality of corrugation peaks and L equals a value of the pitch of the outer conductor of the cable.

Other objects, advantages and salient features of the invention will become apparent from the following detailed description, which, taken in conjunction with the annexed drawings, discloses a preferred embodiment of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EXEMPLARY EMBODIMENTS

Referring to FIGS. 1-6, a coaxial corrugated cable stripper 100, according to an exemplary embodiment of the present invention, generally includes a cable stripper guide 102 and a cable stripper body 104. The cable stripper 100 is used to strip an outer conductor of a cable (FIG. 6) to half of peak. In this way, crimping between the outer conductor of the cable and its jacket is maintained.

Figure 1:
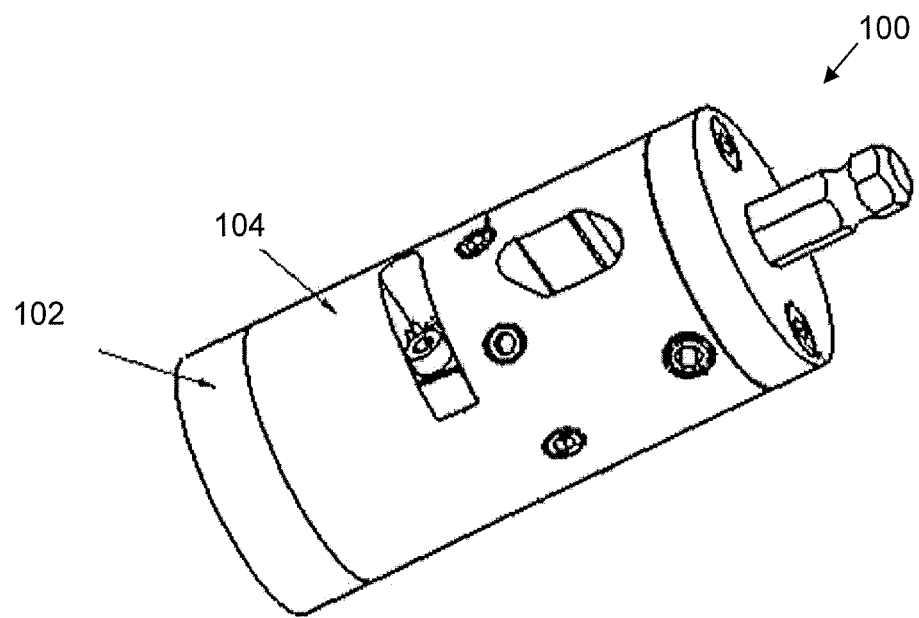
FIG. 1 is a perspective view of a cable stripper according to an exemplary embodiment of the present invention, showing a cable stripper guide coupled with a cable stripper body.
Figure 2:
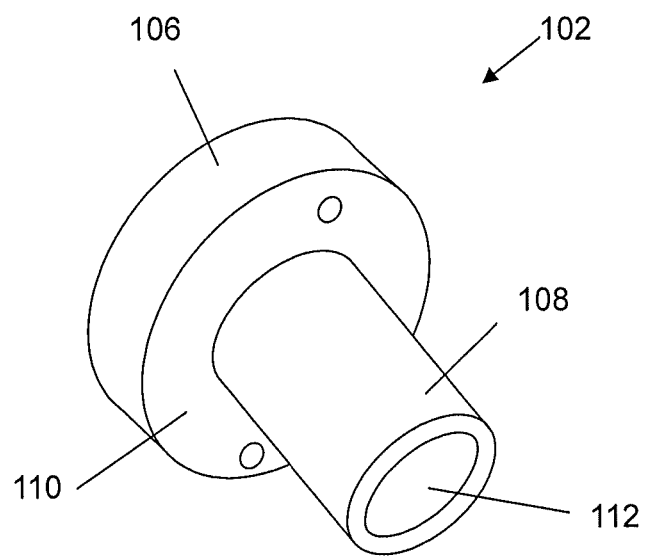
FIG. 2 is a perspective view of the cable stripper guide illustrated in FIG. 1.
Figure 3:
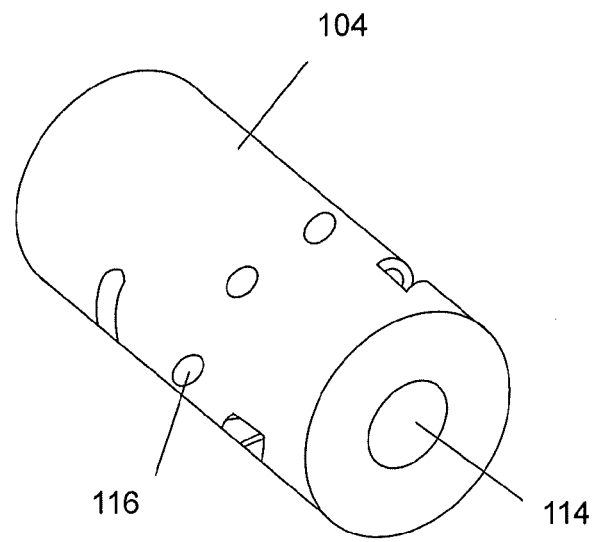
FIG. 3 is a perspective view of the cable stripper body illustrated in FIG. 1.

As seen in FIGS. 2 and 3, the cable stripper guide 102 of the present invention generally includes a connection part 106 and a guiding part 108. The connection part 106 may be substantially circular and may have a substantially flat surface 110. The guiding part 108 preferably extends outwardly from the surface 110 of the connection part 106. The flat surface 110 engages one end of the cable stripper body 104 when the cable stripper guide 102 and the cable stripper body 104 are mated. The guiding part 108 may have an inner bore 112 through which a cable 300 may be inserted.

As shown in FIG. 3, the cable stripper body 104 may have a substantially cylindrical shape with an inner bore 114. The cable stripper body 104 may be provided with at least one hole(s) 116 preferably spaced uniformly along its outer surface. In a preferred embodiment, the cable stripper body 104 is provided with seven holes 116. The holes 116 may extend radially through the cable stripper body 104 to the inner bore 114. The inner bore 114 receives the guiding part 108 of the cable stripper guide 102, as seen in FIGS. 3 and 4.

Figure 4:
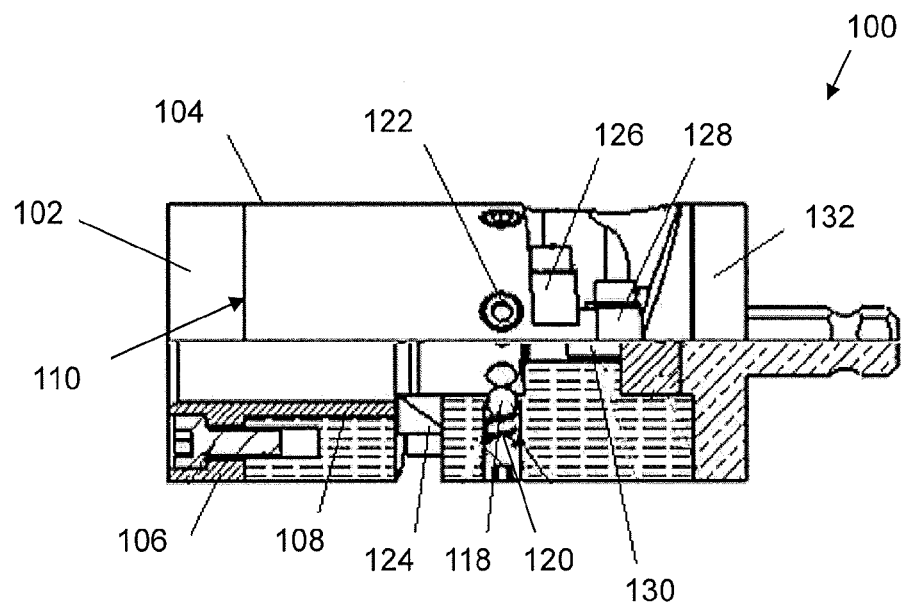
FIG. 4 is a side elevational view of the cable stripper illustrated in FIG. 1, showing a portion of the cable stripper in cross-section.

Referring to FIGS. 3 and 4, at least one marble 118 and at least one spring 120 may be provided in each of the holes 116. The spring 120 may have two ends, one end facing the inner bore 114 of the cable stripper body 104 the other end facing the outer surface of the cable stripper body 104 and being coupled to the cable stripper body 104 with a fastener 122. Any fastener known to one skilled in the art may be used, such as a screw. The marble 118 preferably engages the end of the spring 120 which is facing the inner bore 114 of the cable stripper body 104.

Figure 5:
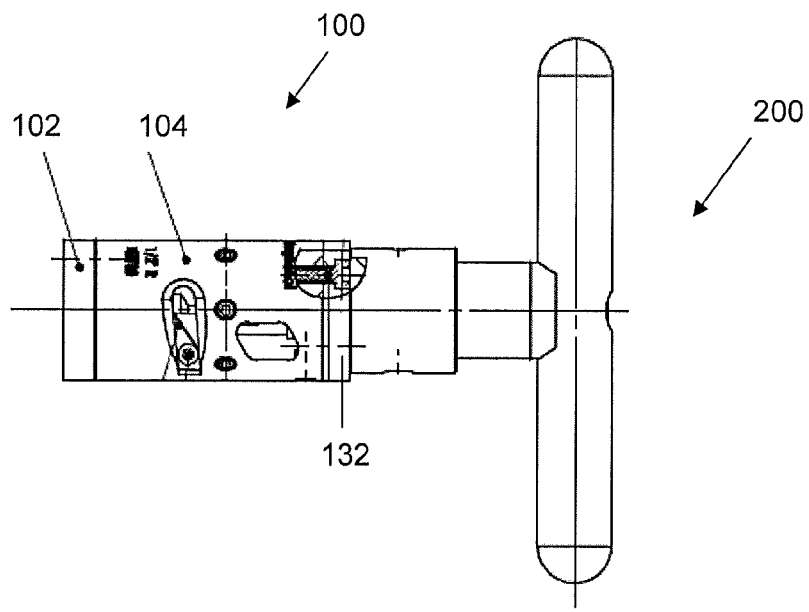
FIG. 5 is a side elevational view of the cable stripper illustrated in FIG. 1, showing a handle assembly coupled therewith.

The cable stripper 100 may be provided with a cable jacket stripper 124 located on the cable stripper body 104 between the guiding part 108 and the marble 118 and spring 120 assembly. Preferably, the cable stripper 100 is also provided with an outer conductor stripper 126, an inner conductor cutter 128, and an insulating layer inner conductor chamfer turning cutter 130, all of which may be located on the cable stripper body 104 between the marble 118 and spring 120 assembly and the hexangular end cap connection handle 132. Specifically, the inner conductor cutter 128 is located on the cable stripper body 104 between the outer conductor stripper 126 and the hexangular end cap connection handle 132. The hexangular end cap connection handle 132 engages the cable stripper body 104 at the end opposite the cable stripper guide 102. As shown in FIG. 5, the hexangular end cap connection handle 132 allows the cable stripper 100 to be attached to a handle assembly 200 or electric rotary driver (not shown).

Figure 6:
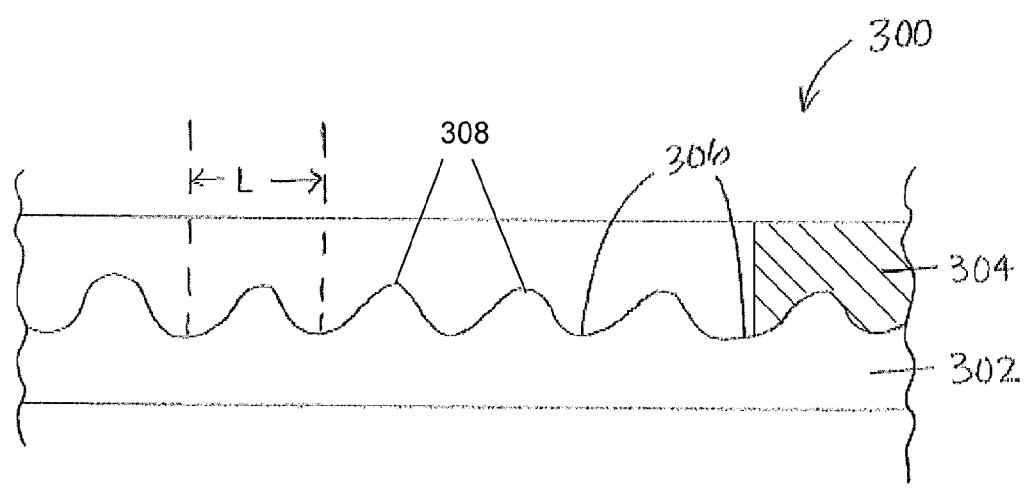
FIG. 6 is a cross-sectional side view of a cable according to an exemplary embodiment of the present invention.

Referring to FIG. 6, in use, the cable stripper guide 102 of the cable stripper 100 uses the marble 118 and spring 120 assembly to stop a cable 300 at the trough position of the outer conductor 302 of the cable 300 when the cable 300 is inserted into the guiding part 108. Specifically, the marble 118 rests in one of the troughs of the outer conductor 302 to physically hold the cable 300 in place. Once the cable 300 is inserted into the guiding part 108, the jacket 304 of the cable 300 is stripped by the cable jacket stripper 124. In FIG. 6, the cable jacket 304 has already been partially stripped off, and the shaded portion depicts the remaining cable jacket 304 to be stripped. Specifically, the cable jacket stripper 124 has a blade (not shown), which rotates and advances along with the cable stripper 100 to cut off the cable jacket 304. The cable stripper 100 is rotated such that the marble 118 in each hole 116 is blocked by the troughs 306 of the outer conductor layer 302 of the cable 300. The cable stripper 100 is rotated further to make the cable 300 pass through the outer conductor stripper 126. The outer conductor stripper 126 rotates and advances relative to the cable 300 such that a blade (not shown) on the outer conductor stripper 126 cuts off the outer conductor layer (not shown) and the insulating layer (not shown). Next, the distance between the marble 118 and spring 120 assembly and the outer conductor stripper 126 is determined according to the positions of the peaks and troughs of the corrugated outer conductor 302 before use. This distance is equivalent to the circular pitch of the cable, which can be easily measured by the user.

The cable stripper guide 102 ensures that the distance between the fixed location of the marble 118 and the fixed location of the outer conductor stripper 126 equals $nL+\frac{1}{2}L$, wherein n is the number of corrugation peaks 308 (FIG. 6) of the outer conductor 302 of the cable 300, and L (FIG. 6) is the circular pitch of the outer conductor of the cable. The circular pitch of the outer conductor 302 is the distance between two neighboring peaks or two neighboring troughs (which should be equal). According to this equation, the cable stripper 100 reliably strips the outer conductor 302 to half of peak, maintaining the crimping between the outer conductor 302 and the cable jacket 304, thereby improving the quality of the stripped cable.

It is preferred that the outer conductor 302 be stripped to half of the peak to ensure that, when the cable 300 is coupled to a cable clamp, for example, via crimping, the crimp is secure. If the outer conductor 302 is stripped such that the exposed interface extends more than half of the peak 308, it may be too large to be crimped within the cable clamp. If the outer conductor 302 is stripped such that the exposed interface extends less than half of the peak 308, the contact interface between the outer conductor 302 and the clamp may be too small, and the crimp will be incomplete.

While particular embodiments have been chosen to illustrate the invention, it will be understood by those skilled in the art that various changes and modifications can be made therein without departing from the scope of the invention as defined in the appended claims.

What is claimed is:

1. A cable stripper, comprising:
   a cable stripper body having an inner bore, at least one hole, and opposite first and second ends;
   a cable stripper guide having a connection part and a guiding part, said connection part engaging said first end of said cable stripper body, and said guiding part being received in said inner bore of said cable stripper body;
   at least one marble, said marble being located within said at least one hole in said cable stripper body; and
   at least one spring, said spring having first and second ends, and said at least one spring being located in said at least one hole in said cable stripper body and engaging said at least one marble.

2. The cable stripper of claim 1, further comprising a cable jacket stripper located on said cable stripper body.

3. The cable stripper of claim 2, further comprising an outer conductor stripper located on said cable stripper body.

4. The cable stripper of claim 3, wherein said outer conductor stripper is located on said cable stripper body between said at least one marble and said second end of said cable stripper body.

5. The cable stripper of claim 4, further comprising an inner conductor cutter located on said cable stripper body between said outer conductor stripper and said second end of said cable stripper body.

6. The cable stripper of claim 2, wherein said cable jacket stripper is located on said cable stripper body between said guiding part of said cable stripper guide and said at least one marble.

7. The cable stripper of claim 1, further comprising a hexangular end cap connection handle engaging said second end of said cable stripper body.

8. The cable stripper of claim 1, wherein
said cable stripper body has an inner bore to which said at least one hole radially extends.

9. The cable stripper of claim 1, wherein
said first end of said at least one spring engages said at least one marble, and said second end of said at least one spring is coupled to said cable stripper body with a fastener.

10. The cable stripper of claim 9, wherein
said fastener is a screw.

11. The cable stripper of claim 1, further comprising,
an insulating layer inner conductor chamfer turning cutter located on said cable stripper body between said at least one marble and said second end of said cable stripper body.

12. A cable stripper, comprising:
a cable stripper body having opposite first and second ends, an inner bore, and a plurality of holes extending to said inner bore;
a cable stripper guide having a connection part and a guiding part, said connection part engaging said first end of said cable stripper body;
a hexangular end cap connection handle engaging said second end of said cable stripper body;
a plurality of marbles, each of said plurality of marbles located within one of said plurality of holes on said cable stripper body;
a plurality of springs, each of said plurality of springs having first and second ends and being located within one of said plurality of holes in said cable stripper body and engaging one of said plurality of marbles;
a cable jacket stripper located within said cable stripper body between said guiding part of said cable stripper guide and said plurality of marbles;
an outer conductor stripper located within said cable stripper body between said plurality of marbles and said hexangular end cap connection handle;
an inner conductor cutter located on said cable stripper body between said outer conductor stripper and said hexangular end cap connection handle; and
an insulating layer inner conductor chamfer turning cutter located on said cable stripper body between said plurality of marbles and said hexangular end cap connection handle,
wherein said first end of each of said plurality of springs engages each of said plurality of marbles, and said second end of each of said plurality of springs is coupled to said cable stripper body with a fastener.

13. The cable stripper of claim 12, wherein
said fastener is a screw.

14. A method of stripping a coaxial corrugated cable stripper, comprising the steps of:
providing a cable having an outer conductor layer, said outer conductor layer including corrugation having a plurality of peaks and a pitch;
providing a cable stripper, including:
  a cable stripper body having a plurality of holes and first and second ends,
  a cable stripper guide having a connection part and a guiding part, said connection part engaging said first end of said cable stripper body,
  a plurality of marbles, each marble located within each of said plurality of holes on said cable stripper body,
  a plurality of springs, each spring having first and second ends, and each being located within each of said plurality of holes in said cable stripper body and engaging each of said plurality of marbles,
  a cable jacket stripper located on said cable stripper body, and
  an outer conductor stripper located on said cable stripper body,
inserting said cable into said guiding part of said cable stripping guide of said cable stripper;
stripping said outer conductor layer to half of peak; and
rotating said cable stripper such that a distance between said outer conductor stripper and each of said plurality of marbles equals $nL+\frac{1}{2}L$, wherein n equals the number of said plurality of peaks and L equals a value of said pitch of said outer conductor of said cable.

* * * * *